United States Patent
Yoon

(10) Patent No.: US 9,626,010 B2
(45) Date of Patent: Apr. 18, 2017

(54) TOUCH PEN, METHOD AND APPARATUS FOR PROVIDING TOUCH FUNCTION

(71) Applicant: Samsung Electronics Co., Ltd., Gyeonggi-do (KR)

(72) Inventor: Sungjin Yoon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/550,149

(22) Filed: Nov. 21, 2014

(65) Prior Publication Data
US 2015/0138123 A1  May 21, 2015

(30) Foreign Application Priority Data
Nov. 21, 2013  (KR) .................. 10-2013-0141946

(51) Int. Cl.
G06F 3/0354 (2013.01)
G06F 3/043 (2006.01)
G06F 3/044 (2006.01)

(52) U.S. Cl.
CPC .......... G06F 3/03545 (2013.01); G06F 3/044 (2013.01); G06F 3/0433 (2013.01); G06F 2203/04106 (2013.01)

(58) Field of Classification Search
CPC ........ G06F 3/043; G06F 3/0433; G06F 3/044; G06F 3/03545; G06F 2203/04106
USPC ....................................................... 345/173
See application file for complete search history.

(56) References Cited

U.S. PATENT DOCUMENTS

| | | | | |
|---|---|---|---|---|
| 4,654,648 A | * | 3/1987 | Herrington | G06F 3/043 345/179 |
| 4,931,965 A | * | 6/1990 | Kaneko | G06F 3/0433 178/18.04 |
| 5,500,492 A | * | 3/1996 | Kobayashi | G06F 3/0433 178/18.04 |
| 5,842,153 A | * | 11/1998 | Kobayashi | G06F 3/0433 178/18.04 |
| 6,067,080 A | * | 5/2000 | Holtzman | G06F 3/03545 178/18.09 |
| 6,360,176 B1 | * | 3/2002 | Nishioki | G01B 7/012 702/113 |
| 6,384,814 B1 | * | 5/2002 | Kobayashi | G06F 3/0433 345/173 |
| 6,457,366 B1 | * | 10/2002 | Hidaka | G01B 5/012 73/634 |
| 6,708,420 B1 | * | 3/2004 | Flanagan | G01B 7/012 33/556 |
| 2002/0130850 A1 | * | 9/2002 | Kobayashi | G06F 3/0346 345/180 |
| 2010/0271345 A1 | * | 10/2010 | Liu | G06F 3/03545 345/204 |
| 2011/0267182 A1 | * | 11/2011 | Westerinen | G06F 3/016 340/407.2 |

(Continued)

FOREIGN PATENT DOCUMENTS

JP         07072965       3/1995

*Primary Examiner* — Tom Sheng
(74) *Attorney, Agent, or Firm* — The Farrell Law Firm, P.C.

(57) ABSTRACT

A touch pen is provided, which includes a case; a tip that is inserted to protrude from one end of the case; and a button that allows an acoustic absorbent to contact with or be detached from a portion of the tip for adjusting a natural frequency of the tip.

12 Claims, 11 Drawing Sheets

(56) References Cited

U.S. PATENT DOCUMENTS

| | | | | |
|---|---|---|---|---|
| 2012/0287068 | A1* | 11/2012 | Colgate | G06F 3/016 345/173 |
| 2012/0293425 | A1* | 11/2012 | Lee | G06F 3/03545 345/173 |
| 2013/0033437 | A1* | 2/2013 | Lee | G06F 3/03545 345/173 |
| 2013/0107144 | A1* | 5/2013 | Marhefka | G06F 1/3275 349/12 |
| 2013/0234994 | A1* | 9/2013 | Hecht | G06F 3/0433 345/177 |
| 2014/0085212 | A1* | 3/2014 | Su | G06F 3/0416 345/173 |
| 2014/0085271 | A1* | 3/2014 | Hwang | G06F 3/046 345/179 |
| 2014/0168170 | A1* | 6/2014 | Lazarescu | G06F 3/043 345/177 |
| 2014/0253465 | A1* | 9/2014 | Hicks | G06F 3/03545 345/173 |
| 2014/0253470 | A1* | 9/2014 | Havilio | G06F 3/0412 345/173 |
| 2014/0253520 | A1* | 9/2014 | Cueto | G06F 3/0383 345/179 |
| 2014/0253522 | A1* | 9/2014 | Cueto | G06F 3/03545 345/179 |

\* cited by examiner (450)

(460)

[710]

[720]

[730]

TOUCH PEN, METHOD AND APPARATUS FOR PROVIDING TOUCH FUNCTION

PRIORITY

This application claims priority under 35 U.S.C. §119(a) to Korean Patent Application No. 10-2013-0141946, filed on Nov. 21, 2013, the entire content of which is incorporated herein by reference.

BACKGROUND OF THE INVENTION

1. Field of the Invention

The present invention relates generally to a touch pen, a method and an apparatus for supporting various touch functions.

2. Description of the Related Art

Electronic devices adopting a touch screen have been widely used. In general, a touch screen refers to a screen installed with a device that allows the input of touch point information when a user's hand or a specific object touches the screen without using a keyboard or a mouse. The function of the touch screen may be achieved by attaching a touch panel to a normal display screen. This touch screen is widely used for portable electronic devices that can hardly adopt an input means, such as a mouse or a keyboard.

The electronic devices have provided various functions, such as painting or handwriting on the touch screen. It is not easy to accurately touch a desired point with a finger in small portable electronic devices. Accordingly, the user demands more accurate and various touch input means. Currently, various touch pens have been introduced to meet the user's demand for accuracy touch inputs. However, typical touch pens cannot satisfy the user's demand for various touch inputs.

SUMMARY OF THE INVENTION

The present invention has been made to address at least the above-mentioned problems and/or disadvantages and to provide at least the advantages described below. Accordingly, an aspect of an embodiment of the present invention is to provide a touch pen, a method and a system for supporting a touch function, that support various kinds of touch inputs by the touch pen using a natural frequency transformation structure.

In accordance with an aspect of the present invention, a touch pen is provided, which includes a case; a tip that protrudes from one end of the case; and a button that allows an acoustic absorbent to contact with or be detached from a portion of the tip for adjusting a natural frequency of the tip.

In accordance with another aspect of the present invention, a touch pen is provided, which includes a case; a tip protrudes from one end of the case and has at least a first member and a second member, the first member being accepted by the second member; and an adjustment button that is connected with a portion of the tip to adjust an effective length of the tip for adjusting a natural frequency of the tip.

In accordance with another aspect of the present invention, a method for supporting a touch function is provided, which includes determining a frequency band of a touch generated using a touch pen; extracting a function setup value corresponding to the frequency band; and executing a function according to the function setup value.

In accordance with another aspect of the present invention, an apparatus for supporting a touch function is provided, which includes a touch panel configured to detect occurrence of a touch; a sensor unit configured to receive frequency information of the touch; a controller configured to determine a frequency band on the basis of the received frequency information, to extract a function setup value corresponding to the frequency band of the touch, and to execute a function according to the function setup value.

BRIEF DESCRIPTION OF THE DRAWINGS

The above and other aspects, features and advantages of the present invention will be more apparent from the following detailed description in conjunction with the accompanying drawings, in which.

DETAILED DESCRIPTION OF EMBODIMENTS OF THE PRESENT INVENTION

Figure 1:
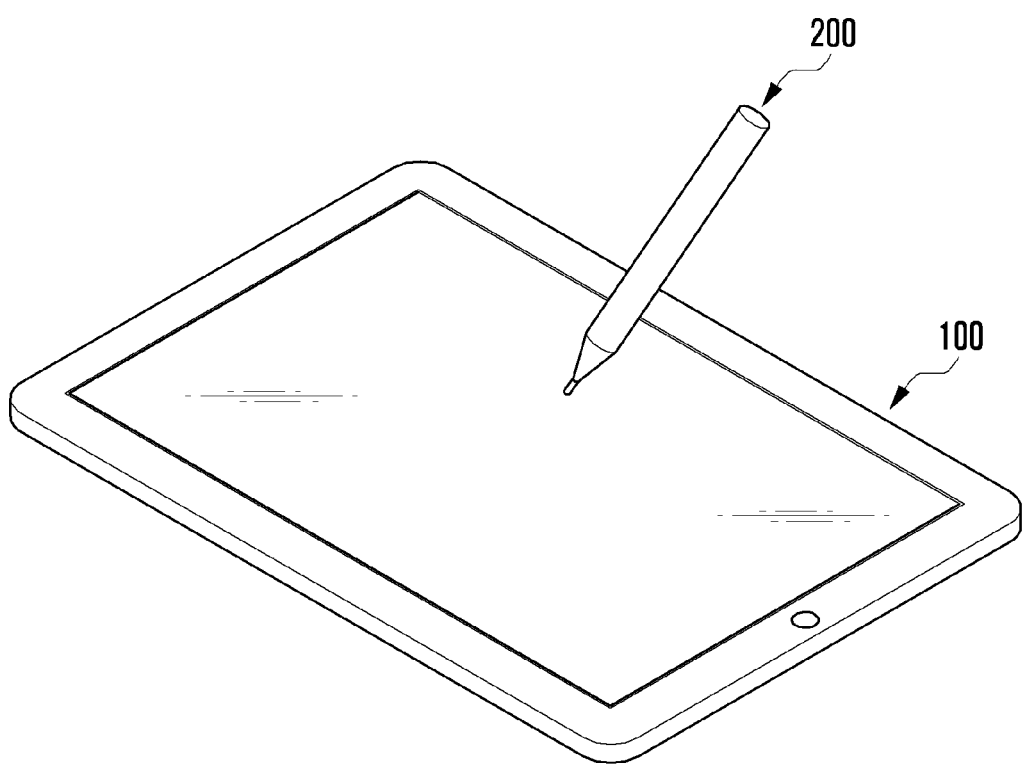
FIG. 1 illustrates an apparatus for supporting a touch function and a touch pen according to an embodiment of the present invention.

Various embodiments of the present invention will be described with reference to the accompanying drawings. It should be noted that the same elements will be designated by the same reference numerals although they are shown in different drawings. Further, detailed descriptions related to well-known functions or configurations capable of making subject matters of the present invention unnecessarily obscure will be omitted.

Meanwhile, embodiments of the present invention shown and described in this specification and the drawings correspond to specific examples presented in order to easily explain technical contents of the present invention, and to help comprehension of the present invention, but are not intended to limit the scope of the present invention. It will be apparent to those having ordinary knowledge in the technical field, to which the present invention pertains, that it is possible to practice other modified embodiments based on the technical idea of the present invention as well as the embodiments disclosed herein.

A touch pen, a method and a system for supporting a touch function according to embodiments of the present invention may allow easy and various touch inputs by adopting a configuration that transforms the natural frequency of a tip in the touch pen.

FIG. 1 illustrates an apparatus for supporting a touch function and a touch pen according to an embodiment of the present invention.

Referring to FIG. 1, an apparatus for supporting a touch function of the present invention refers to an electronic device 100 that interworks with a touch pen 200 to support a touch function.

The apparatus for supporting a touch function with the above configuration detects different frequencies depending on the length of a tip of the touch pen 200 and supports a specific function corresponding to each frequency. Here, the tip includes a touch portion that touches a screen in a touching operation and is longitudinally installed at the center inside the touch pen, wherein one end of the tip protrudes from a case of the touch pen.

The touch pen 200 includes a case formed in a shape of a pen, a tip that touches the screen upon touching, and a button for adjusting the natural frequency of the tip. The button for adjusting the natural frequency of the tip is, for example, an adjustment button that adjusts the position of an acoustic absorbent (a material that contacts with the tip to absorb vibration) or a button that allows the acoustic absorbent to contact with or be detached from a portion of the tip.

When the touch pen 200 includes a button that allows the acoustic absorbent to contact with or be detached from a portion of the tip, the tip generates a wave of a constant frequency upon the occurrence of a touch without the contact with the acoustic absorbent. Contrarily, if the acoustic absorbent contacts with a portion of the tip, the tip generates a changed frequency upon the occurrence of a touch. Every object has its own natural frequency, and the natural frequency of the same material may vary with the size and the shape. According to the above-described principle, when the acoustic absorbent contacts with a portion of the tip, it gives the effect that the effective length of the tip is shortened, so that the frequency is changed. Here, the effective length of the tip is the distance between the touching point on the tip and the acoustic absorbent contacting point on the tip. When the touch pen 200 includes an adjustment button that adjusts the position of an acoustic absorbent, the natural frequency of the tip is changed by changing the position of the acoustic absorbent.

Detailed description about the configuration and operation of the touch pen 200 will be made with reference to FIGS. 2A to 4B.

The electronic device 100 may be provided with a touch panel and a display unit, and may recognize the position of a touch event on the touch panel by detecting the change in the capacitance of the touch pen 200 that touches the touch panel. In addition, the electronic device 100 may include a vibration detection sensor (e.g., Piezo sensor) or an acoustic detection sensor (e.g., microphone). Accordingly, the electronic device 100 may recognize a frequency band of a wave (e.g., sound) that is generated when the touch pen 200 touches the touch panel. Consequently, the electronic device 100 may receive various touch signals used for a specific user function. The detailed configuration and operation of the electronic device 100 will be described with reference to FIGS. 5A to 8.

As described above, the system for supporting a touch function according to the embodiment of the present invention may determine a frequency band of a wave (e.g., sound) generated when the touch pen 200 touches the touch panel and apply the determination result to the execution of functions, to thereby support operations of various touch functions.

Figure 2A:
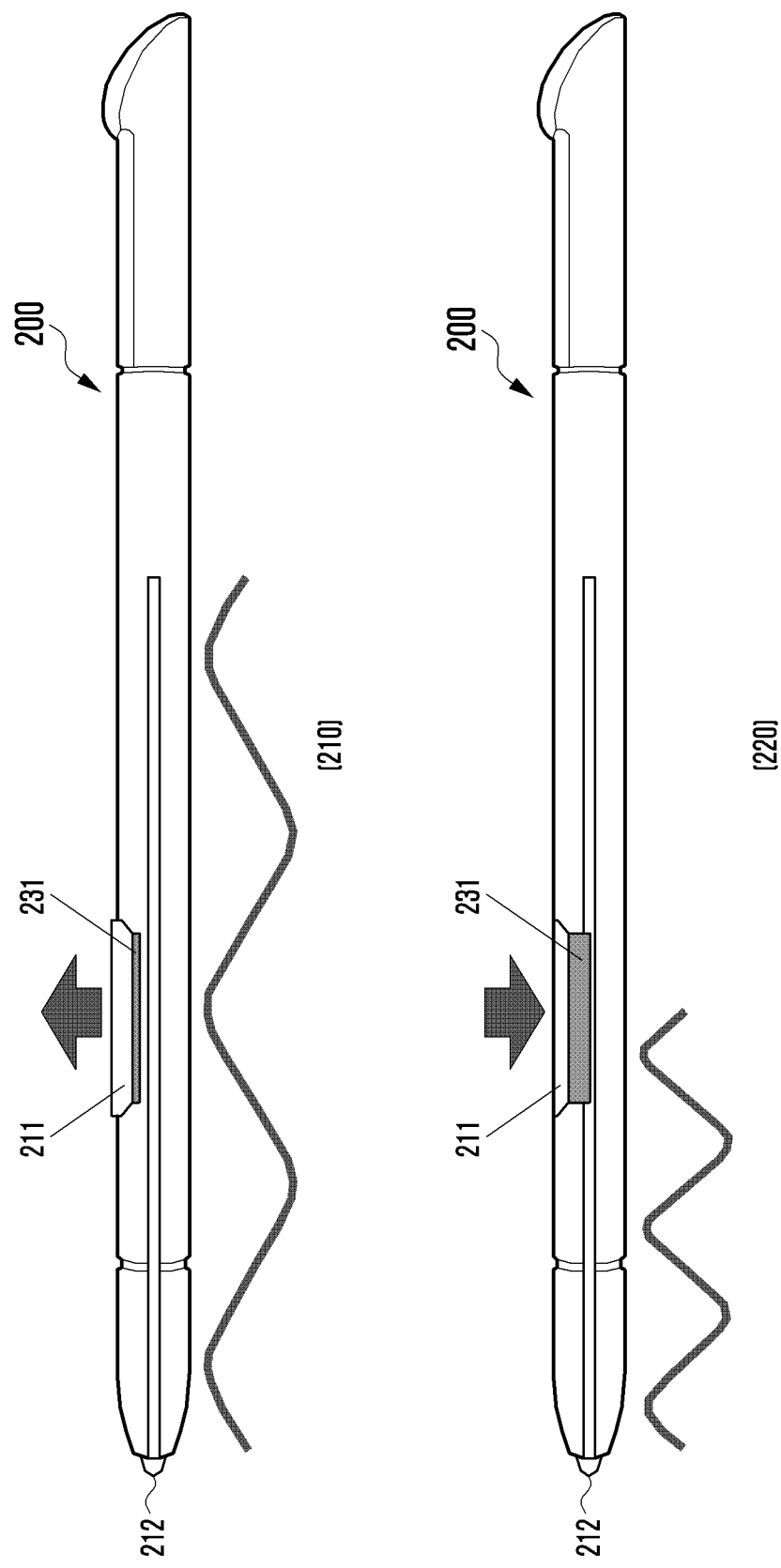
FIGS. 2A and 2B illustrate an internal configuration of a touch pen according to a first embodiment of the present invention.
Figure 2B:
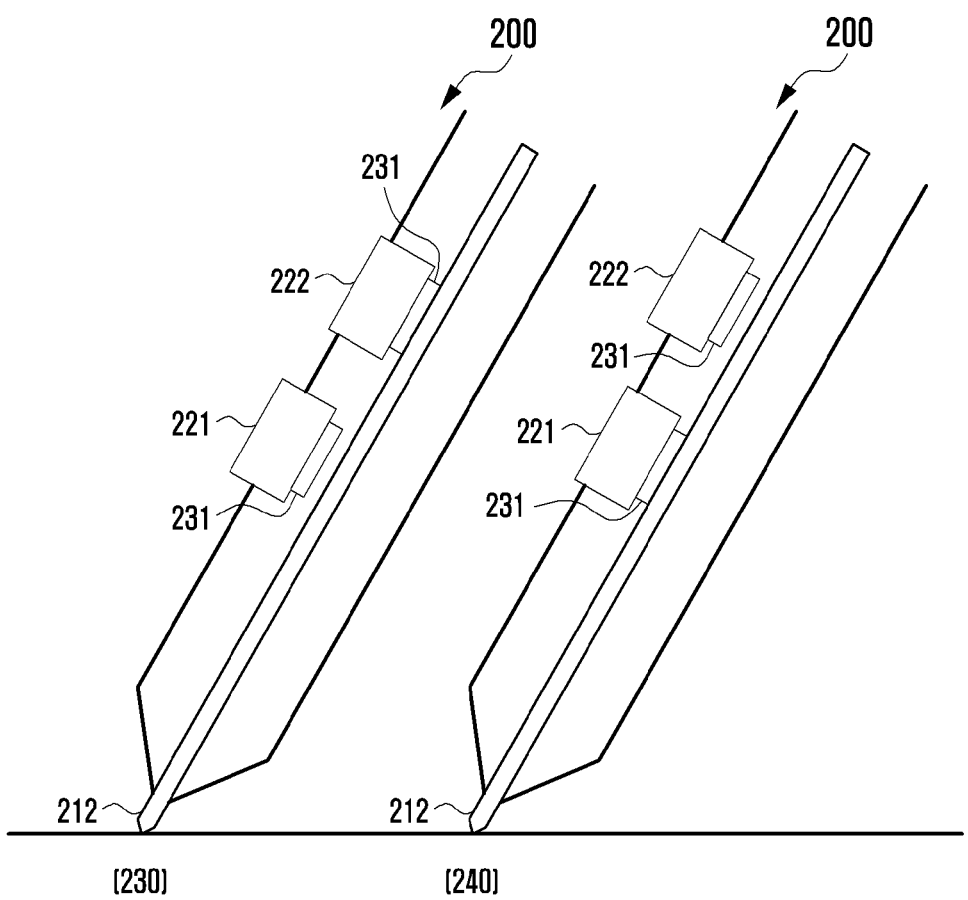

FIGS. 2A and 2B illustrate an internal configuration of a touch pen according to a first embodiment of the present invention.

FIG. 2A shows a structure of a touch pen with a button mounted, and an acoustic absorbent is attached to the button.

The touch pen 200 includes a case in the shape of a pen, a tip 212 inserted in the case with one end protruding from the case, an acoustic absorbent 231 that, when comes into contact with a portion of the tip 212, absorbs the vibration of the tip, and a button 211 to which the acoustic absorbent 231 is attached. The acoustic absorbent 231 may contact with or may be detached from a portion of the tip 212 depending on the press of the button.

Referring to 210, the button 211 of the touch pen 200 is not pressed. Accordingly, the acoustic absorbent 231 is detached from the tip 212 of the touch pen.

Referring to 220, the button 211 of the touch pen 200 is pressed. Thus, the acoustic absorbent 231 of the touch pen contacts with the tip 212.

When a touch induced by the touch pen 200 occurs, a wave having a specific frequency according to the effective length of the tip 212 is generated. Here, when the touch occurs while the acoustic absorbent 231 of the touch pen 200 is detached from the tip 212, the effective length of the tip 212 is relatively long. Thus, a wave having a long wavelength and a low frequency is generated. Contrarily, when the touch occurs while the acoustic absorbent 231 of the touch pen 200 is in contact with a portion of the tip 212, the effective length of the tip 212 is shortened. Therefore, a wave having a short wavelength and a high frequency is generated.

FIG. 2B shows the touch pen 200 with two buttons mounted. Referring to FIG. 2B, a first button 221 is mounted at the position relatively close to the protruding portion of the tip 212 on the case of the touch pen 200, and the second button 222 is mounted at the position relatively far from the protruding portion of the tip 212.

Referring to 230, the button 222 positioned relatively far from the protruding portion of the tip 212 is pressed. In this case, when a touch occurs, the generated wave has the natural frequency according to the effective length of the tip, i.e., the length from the touching point on the tip 212 to the contacting position on the tip where the second button 222 is pressed. That is, when the touch pen of 230 touches the screen, the wavelength becomes long, so the wave of a relatively low frequency is generated.

Referring to 240, the first button 221 relatively close to the protruding portion of the tip 212 is pressed. In this case, when a touch occurs, the wave generated has the natural frequency according to the effective length of the tip, i.e., the length from the touching point on the tip 212 to the contacting position on the tip where the first button 221 is pressed. That is, when the touch pen of 240 touches the screen, the wavelength becomes short, so the wave of a relatively high frequency is generated.

Figure 3:
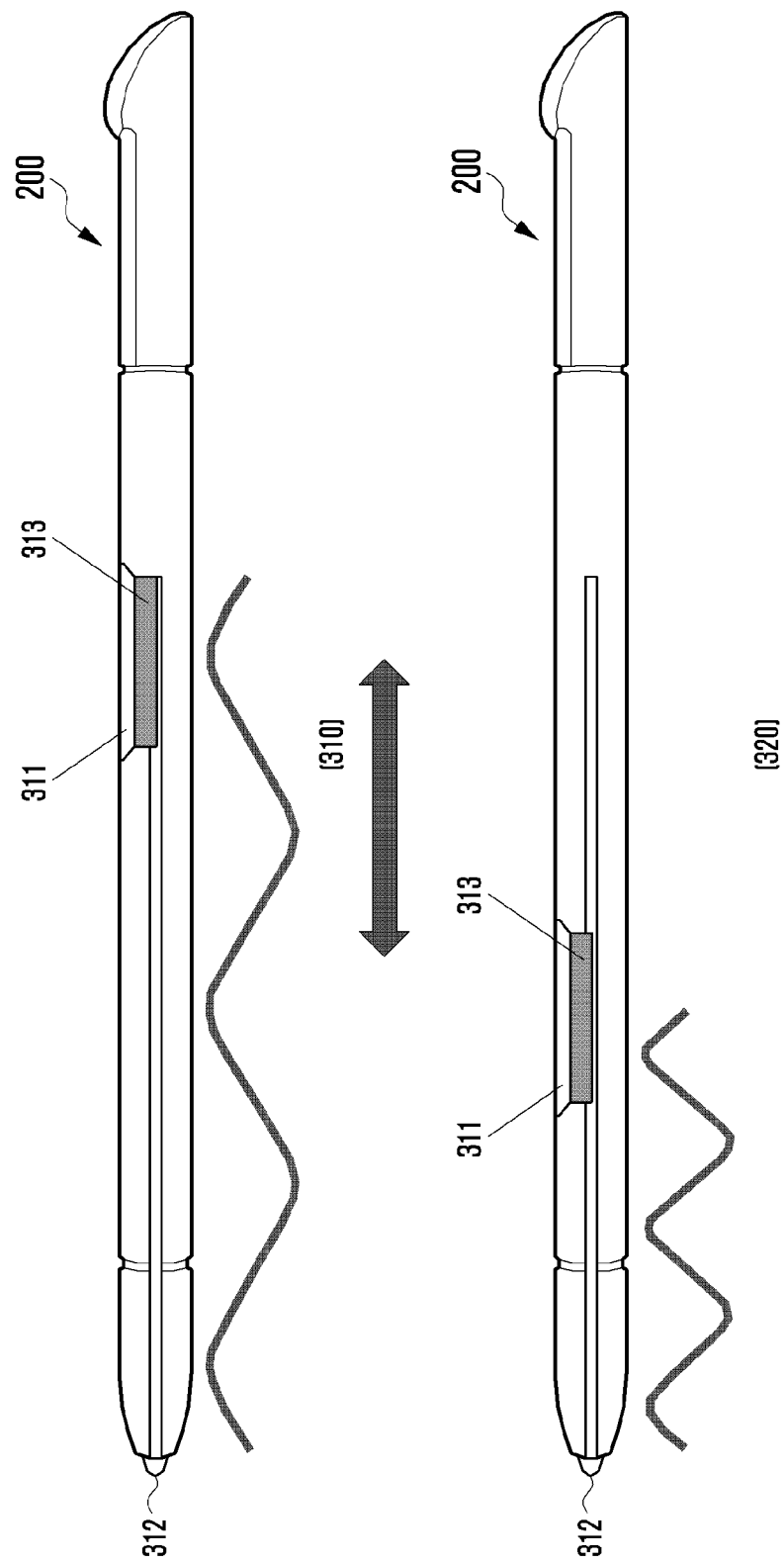
FIG. 3 illustrates an internal configuration of a touch pen according to a second embodiment of the present invention.

FIG. 3 illustrates an internal configuration of a touch pen according to a second embodiment of the present invention.

The touch pen 200 includes a case, a tip 312, an acoustic absorbent 313 in contact with the tip 312, and an adjustment button 311 to adjust the position of the acoustic absorbent 313. The tip 312 is mounted on the case of the touch pen, and one end of the tip 312 protrudes from the case. In addition, the adjustment button 311 has the acoustic absorbent 313 that is attached thereto, and the adjustment button 311 protrudes from the case. Further, the case of the touch pen 200 has a guide rail for allowing the adjustment button 311 to slide along the case within a predetermined distance. If necessary, a locking means may be further provided on the adjustment button 311.

Referring to 310, the adjustment button 311 of the touch pen 200 is positioned relatively far from the touch portion of the touch pen 200. Accordingly, when a touch induced by the tip 312 occurs, the generated wave has a relatively long wavelength and a relatively low frequency.

Referring to diagram 320, the adjustment button 311 is positioned relatively close to the touch portion where the tip 312 protrudes. Accordingly, when a touch induced by the tip 312, the generated wave has a relatively short wavelength and a relatively high frequency.

As set forth above, the touch pen 200 may be configured to adjust the position of the acoustic absorbent 313 that contacts with the tip 312 by moving the adjustment button 311, so the frequency of the wave generated upon the touch may be changed.

Figure 4A:
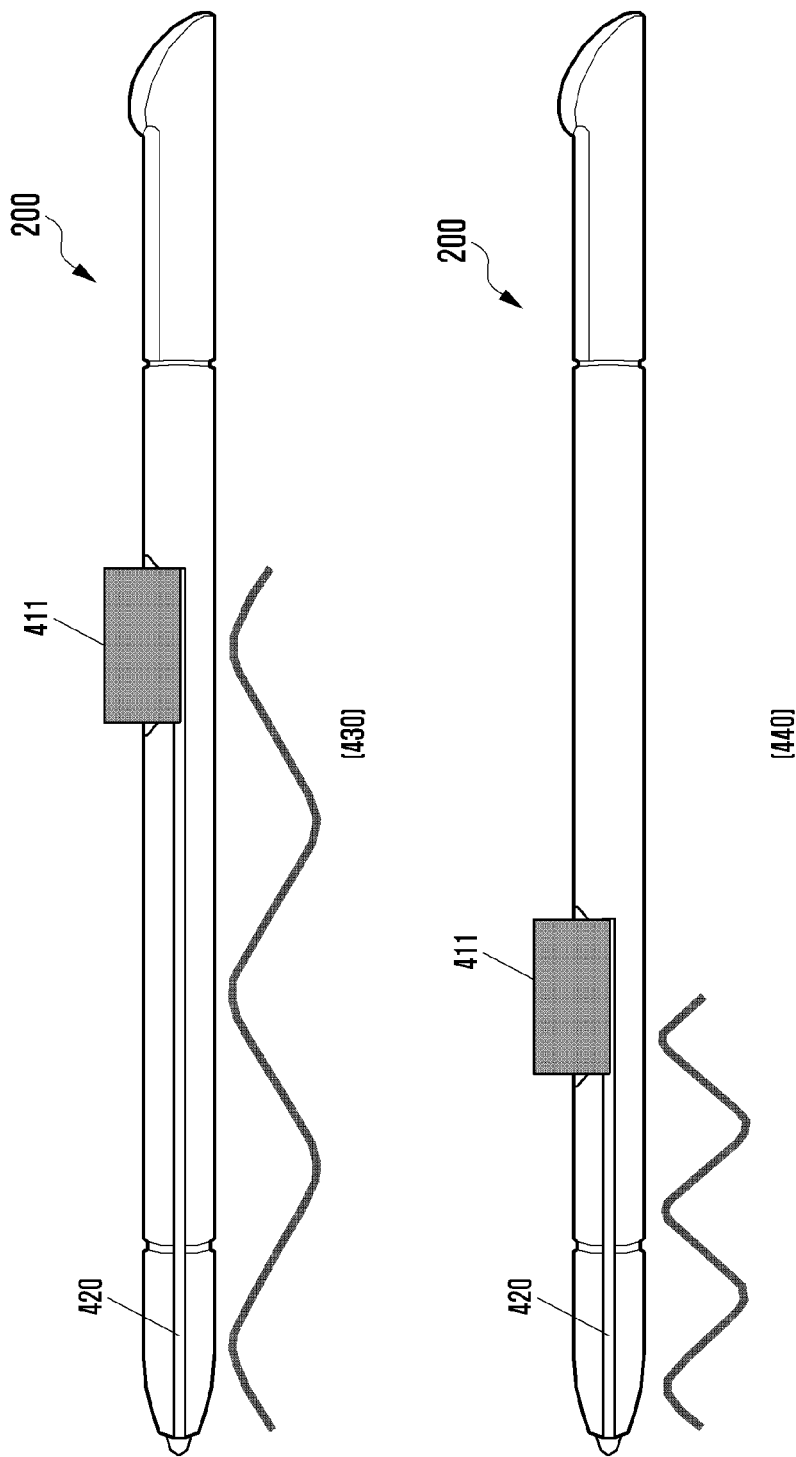
FIGS. 4A and 4B illustrate an internal configuration of a touch pen according to a third embodiment of the present invention.
Figure 4B:
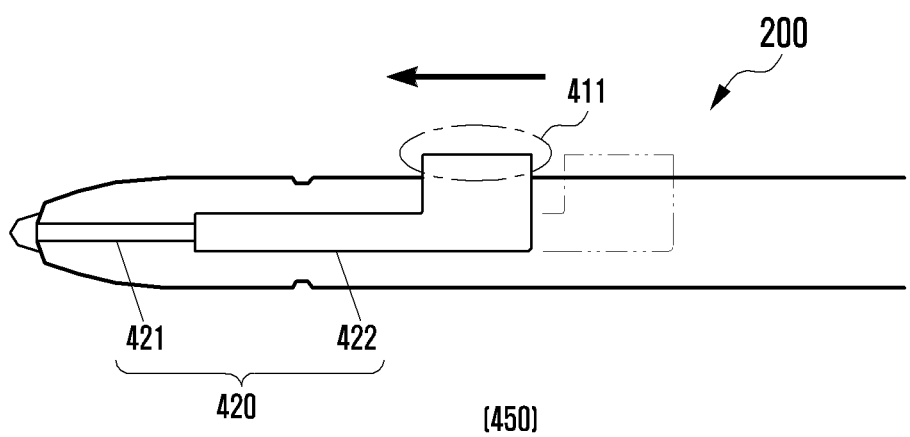
Figure 4B:
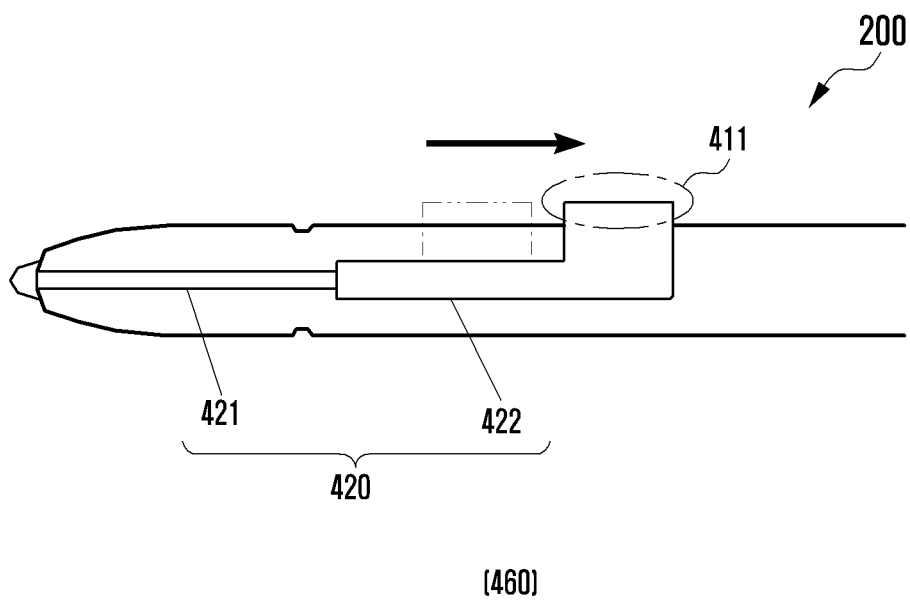

FIGS. 4A and 4B illustrate an internal configuration of a touch pen according to a third embodiment of the present invention.

Referring to FIG. 4A, a touch pen 200 includes an adjustment button 411 and a tip 420. The adjustment button 411 is connected with the tip 420, and the effective length of the tip 420 may be adjusted in response to the movement of the adjustment button 411.

Referring to 430, the adjustment button 411 is positioned relatively far from the touch portion of the tip 420 so that the effective length of the tip 420 becomes long.

Referring to 440, the adjustment button 411 is positioned relatively close to the touch portion so that the effective length of the tip 420 becomes short.

As shown above, the adjustment button 411 may be connected with a portion of the tip 420 to thereby adjust the effective length of the tip 420. The adjustment of the effective length of the tip 420 will be described with reference to FIG. 4B.

FIG. 4B illustrates that the tip 420 may be comprised of two or more components, in which one component is accepted by the other like an extendable antenna. Here, the tip 420 includes the first member 421 that has the touch portion and a second member 422 that is connected with the adjustment button 411.

Referring to 450, as the adjustment button 411 moves in the direction of an arrow, the second member 422 accepts the first member 421 therein in order to adjust the effective length of the tip 420. The second member 422 has a hollow, of which the diameter is greater than the diameter of the first member 421. Accordingly, the first member 421 is inserted into the hollow of the second member 422, so that the effective length of the tip 40 is shortened.

Referring to 460, as the adjustment button 411 is moved in the direction of an arrow, the second member 422 is moved in the same direction as well in order to adjust the effective length of the tip 420. At this time, the first member 421 of the tip 420 that has been accepted in the hollow of the second member 422 comes out from the hollow so that the effective length of the tip 420 is increased.

As described above, the tip 420 may be adjusted in the effective length by moving the adjustment button 411. Further, the frequency generated upon the touch of the tip may be adjusted by the adjustment of the effective length as well.

Figure 5A:
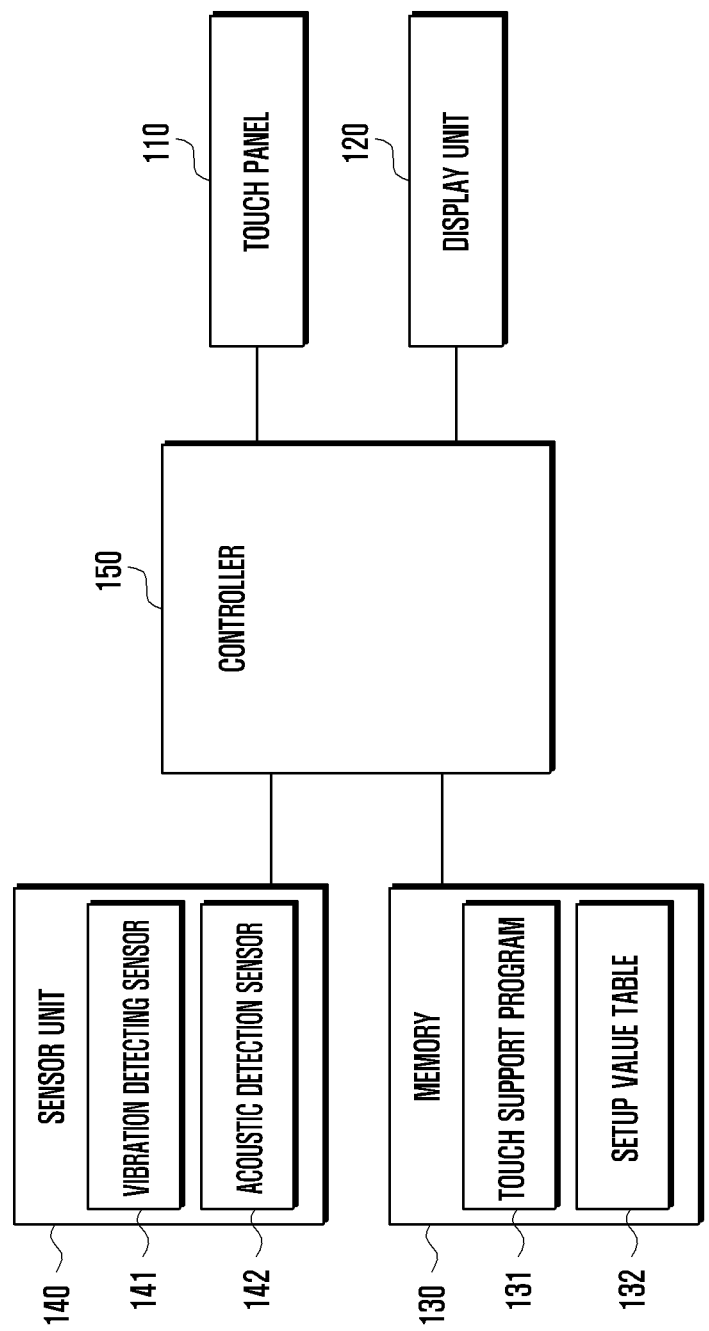
FIGS. 5A and 5B illustrate a configuration of an electronic device according to an embodiment of the present invention.
Figure 5B:
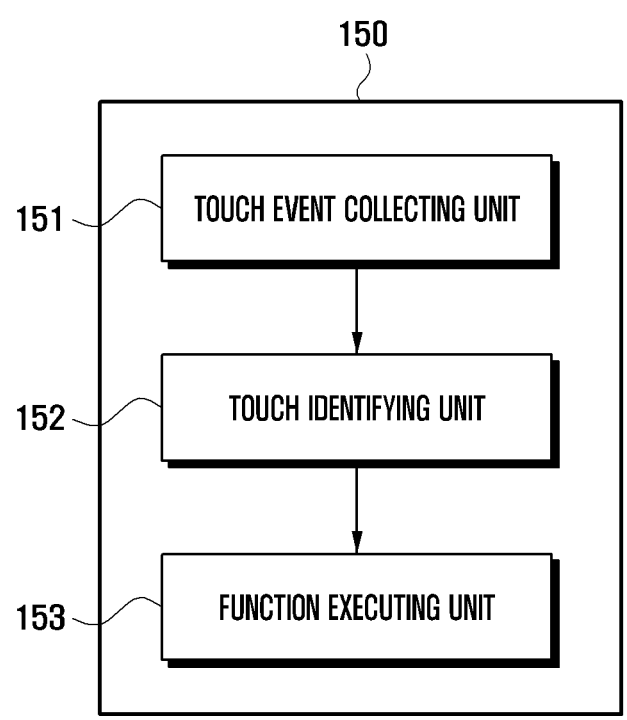

FIGS. 5A and 5B illustrate a configuration of an electronic device according to an embodiment of the present invention.

Referring to FIG. 5A, an electronic device 100, according to an embodiment of the present invention, includes a touch panel 110, a display unit 120, a memory 130, a sensor unit 140, and a controller 150.

The touch panel 110 detects a user's touch input. The touch panel 110 may be implemented by a capacitive type, a resistive type, an infrared type, or the like. Alternatively, the touch panel 110 may be made in the form by which the contact or pressure of an object can be detected. The touch panel 110 transfers electric signals generated in response to a user's gesture with respect to the touch panel 110 to the controller 150.

The touch panel according to an embodiment of the present invention detects the touch by the touch pen 200 and transfers the touch signal to the controller 150.

The display unit 120 may be implemented by Liquid Crystal Displays (LCDs), Organic Light Emitting Diodes (OLEDs), Active Matrix Light Emitting Diodes (AMO-LEDs), or the like, and provides various pieces of visual information, such as menus, input data, and function setup information, to the user.

The display unit 120 according to the embodiment of the present invention displays execution images of input programs (e.g., note applications) based on the touch pen 200. In addition, the display unit 120 displays an input result of the touch using the touch pen 200.

The memory 130 stores programs and data necessary for the operation of the electronic device 100. The memory 130, according to the embodiment of the present invention, stores a touch support program 131 for supporting a touch function based on the touch pen 200, and a setup value table 132 for operating the touch support programs. Further, the memory 130 stores a frequency band table (not shown) that is an index for determining the frequency band.

The touch support program 131 supports the touch function. Specifically, the touch support program 131 supports the activation of the touch panel 110 and detection of the position and the wave of the occurrence of a touch event.

The setup value table 132 may include function setup values by which a user function is defined to correspond to the touch event on the touch panel 110. Further, the setup value table 132 may be configured to have different function setup values depending on running touch support programs. For example, the setup value table 132 is configured as follows.

TABLE 1

| Frequency Bands | Touch Support Programs | Function Setup values |
| --- | --- | --- |
| First Band | Note Function Program | Black, Pencil |
|  | Web Execution Program | Touch Point Selection |
| Second Band | Note Function Program | Red, Highlighter |
|  | Web Execution Program | Touch Point Menu Display |

The setup value table 132 is an example only, and the number of frequency bands may increase according to the number of adjustment of frequency. In addition, setup value table 132 may include various function setup values with the increase in the number of frequency bands. As shown in Table 1, the function setup values indicate the type of pen, color of pen, line thickness, or the like. The function setup values may further include the type of input field by which a pen input is performed, in the details. For example, in the case of executing a note application, the input fields may include a search window, a note window, a schedule input window, or the like.

The sensor unit 140 may be comprised of a motion sensor and a proximity sensor in order to detect a user's gesture and motion necessary for the operation of the electronic device 100. The sensor unit 140 according to the present invention may include at least one of a vibration detection sensor 141 and an acoustic detection sensor 142. The vibration detection sensor 141 detects the vibration upon the touch of the touch pen 200. In addition, the acoustic detection sensor 142 detects the sound generated upon the touch of the touch pen 200. That is, the vibration detection sensor 141 or the acoustic detection sensor 142 detects the vibration or the sound generated when touching to thereby recognize the natural frequency of the touched material. Further, the vibration detection sensor 141 recognizes the frequency of the detected vibration and creates an electric signal corresponding to the frequency. Then, the vibration detection sensor 141 transmits the electric signal of the frequency to the controller 150. For example, the Piezo sensor may be used for the vibration detection sensor 141. The acoustic detection sensor 142 recognizes the frequency of the detected sound and creates an electric signal corresponding to the frequency to be thereby transmitted to the controller 150 as well. Hereinafter, "electric signal of frequency" will be referred to as "frequency information".

The controller 150 controls overall operations of the electronic device 100. The controller 150 according to the embodiment of the present invention determines coordinates of touch points of the touch pen 200 through signals received from the touch pen 110. The controller 150 receives the frequency information of the wave generated upon touching through the sensor unit 140. The sensor unit 140 analyzes the received frequency information to recognize the corresponding frequency band. The controller 150 determines the function setup value in the setup value table 132 according to the frequency band. The controller 150 controls the display unit 120 to display a result corresponding to the determined function setup value.

The operation of the controller 150 will be described in more detail with reference to FIG. 5B. FIG. 5B illustrates a configuration of a controller according to an embodiment of the present invention.

Referring to FIG. 5B, the controller 150 includes a touch event collecting unit 151, a touch identifying unit 152, and a function executing unit 153.

The touch event collecting unit 151 collects various pieces of information related to all the detected touches on the touch pen 110. That is, the touch event collecting unit 151 collects information on the touch occurrence position and the touch duration time. In addition, the touch event collecting unit 151 collects frequency information of the wave input through the sensor unit 140. Further, the touch event collecting unit 151 transfers the collected information to the touch identifying unit 152.

The touch identifying unit 152 receives the information on the touch event from the touch event collecting unit 151, and recognizes the type of touch on the basis of the information. The information on the touch event includes, for example, touch position information, touch duration time, and frequency information of the wave generated upon the touch. The touch identifying unit 152 recognizes the type of touch on the basis of the received information on the touch event. Particularly, the touch identifying unit 152 analyzes the frequency information of the wave transferred from the touch event collecting unit 151. The analysis may be conducted by classifying the transferred information on the touch event into the corresponding frequency band, based on the pre-stored frequency band table. The touch identifying unit 152 classifies touches having different frequency bands of waves generated upon the touches. Further, the touch identifying unit 152 transmits touch event-related information including information on the frequency band of the touch (hereinafter, referred to as frequency band information) to the function executing unit 153.

The function executing unit 153 executes a corresponding user function, based on the touch event-related information received from the touch identifying unit 152. In the embodiment of the present invention, the function executing unit 153 determines the function setup value on the basis of the frequency band information. At this time, the function executing unit 153 refers to the pre-stored setup value table 132 in determining the function setup value. The function setup value in the setup value table may be changed by the user's request. Further, the function executing unit 153 supports to execute a specific user function corresponding to the determined function setup value.

Figure 6:
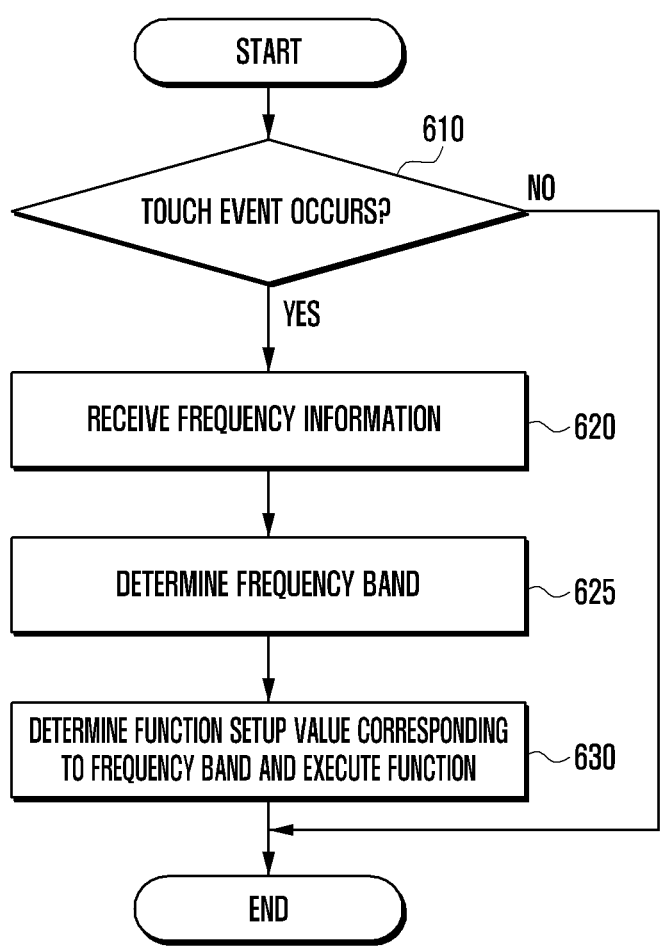
FIG. 6 is a flowchart illustrating a method for supporting a touch function according to an embodiment of the present invention.

FIG. 6 is a flowchart illustrating a method for supporting a touch function according to an embodiment of the present invention. The controller 150 verifies whether a touch event occurs in step 610. If a touch event does not occur, the procedure ends. Once the touch event is identified (i.e., a touch event occurs), the controller 150 receives frequency information of the wave generated upon the occurrence of the touch event in step 620. The frequency information is then transferred to the controller 150 through the sensor unit 140. When the frequency information of the wave generated upon the occurrence of the touch event is transferred, the controller 150 determines the frequency band, based on the received frequency information, in step 625. The frequency band is referred to on the basis of the frequency band table pre-stored in the memory 130.

After the determination of the frequency band, the controller 150 applies the function setup value corresponding to the frequency band and executes the corresponding function in step 630.

For example, when the touch occurs while the acoustic absorbent is attached to a portion of the tip, the wave generated by the touch pen 200 corresponds to a relatively high frequency band (e.g., the second band). In this case, the touch identifying unit 152 determines the frequency band (the second band) on the basis of the frequency information of the wave and transmits the information on the frequency band to the function executing unit 153. Then, the function executing unit 153 determines the function setup value with reference to the setup value table 132, based on the received information on the frequency band. If the touch occurs while the note function program is in progress, the function executing unit 153 controls to execute a function of a red highlighter on the basis of the setup value table 132.

Figure 7:
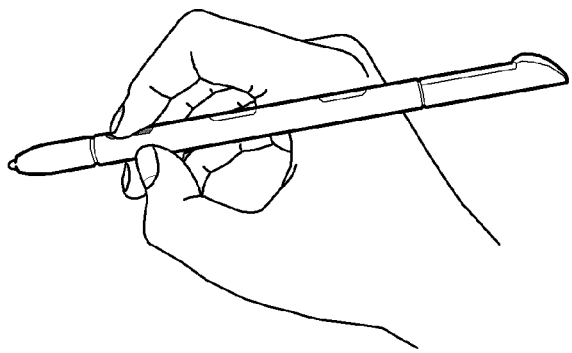
FIG. 7 illustrates an example of selecting a button in a touch pen according to an embodiment of the present invention.
Figure 7:
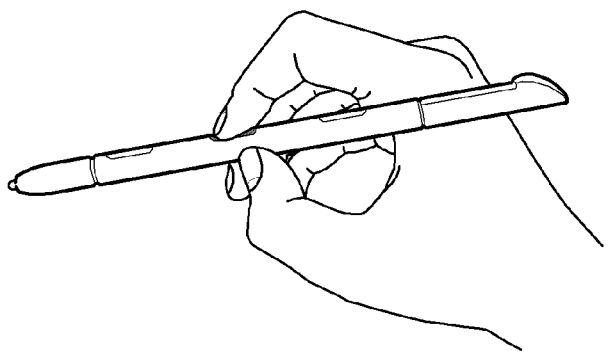
Figure 7:
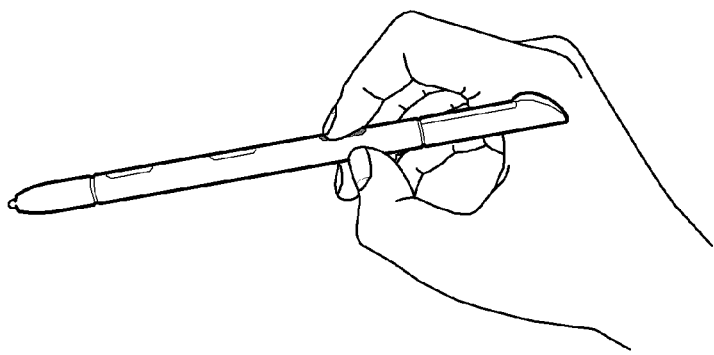

FIG. 7 illustrates an example of selecting a button in a touch pen according to an embodiment of the present invention.

If a plurality of buttons (e.g., three buttons) are provided in the touch pen 200 to control the frequency, the touch pen 200 may support to input the line with different thickness and darkness according to the gripping position of the touch pen. In general, if the user grips a pen at the rear portion thereof, the pen writes light and thick lines, and, if the user grips a pen at the front portion adjacent to the touch portion thereof, the pen writes dark and thin lines.

Referring to 710, if the user grips the touch pen 200 while pressing the button close to the touch portion, dark and thin lines are supported to be input. Referring to 730, if the user grips the touch pen 200 while pressing the button at the rear portion thereof, the input lines are light and thick. Referring to 720, if the user grips the touch pen 200 while pressing the intermediate button, the pen writes lines in medium darkness and thickness. Accordingly, the method may be applied to input lines with different darkness and thickness according to the position of the buttons as described above.

Figure 8:
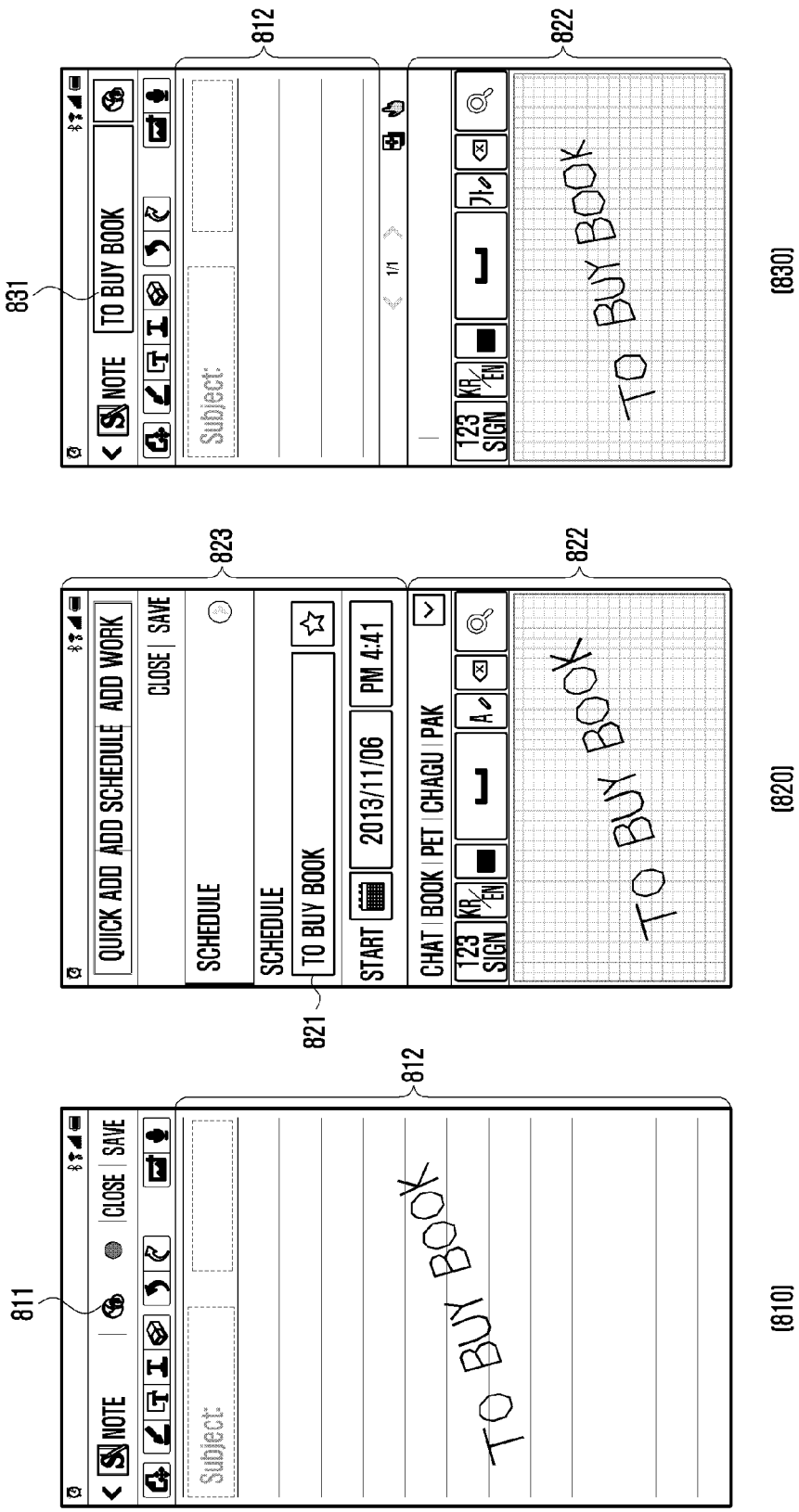
FIG. 8 illustrates operations of providing the different type of input field depending on frequency information in an apparatus for supporting a touch function according to an embodiment of the present invention.

FIG. 8 illustrates operations of providing the different type of input field depending on frequency information in an apparatus for supporting a touch function according to an embodiment of the present invention.

When a specific application (e.g., note application) is executed, the function setup value according to the frequency band of the touch pen 200 is different according to the embodiment of the present invention. The function setup values indicate the type of pen, color of pen, and line thickness (e.g., in the note application). Furthermore, the type of input field is included in the function setup values, which will be described with reference to FIG. 8. FIG. 8 illustrates the screens on which the note function application is executed.

Referring to 810, when the touch having a frequency of the first band is input (e.g., in the case of pressing the intermediate button of the touch pen or the adjustment button is positioned at the intermediate portion of the pen) during the execution of the application, the input field is a note window 812. Accordingly, the user may input a memo in the note window 812.

Referring to 820, when a touch that has a frequency of the second band is input (e.g., in the case of pressing the button close to the touch portion of the touch pen or the adjustment button is positioned close to the touch portion of the touch pen) during the execution of the same application, the input field is a schedule input window 821. That is, when the input of the touch pen 200 is at the same position, the input field is changed according to the frequency band upon the touch. Here, the input field has been changed to the schedule input window 821 of a schedule input page 823, and a text transformation pad 822 that transforms a pen input to a text is displayed on the screen, upon the input of the touch having a frequency of the second band.

Referring to 830, the touch that has a frequency of the third band is input (e.g., in the case of pressing the rear button of the touch pen or the adjustment button is positioned at the rear portion of the pen) during the execution of the application. In this case, the input filed is a search window 831. In order to display the search window 831, it may be required to input a specific button, such as an icon, for retrieving the search window 831. Here, the search window 831 is retrieved, and at the same time, an input content is displayed on the search window 831 once the frequency of the third band is input. At this time, when the touch input that has the frequency of the third band is received, the input field of the note window 812 is transformed to the search window 831, and the a text transformation pad 822 that transforms a pen input to a text in the search window 831 is displayed as well.

As describe above, the touch pen 200 may adjust the frequency and differently apply the function setup value according to each frequency band by interworking with the devices supporting the touch pen.

Various embodiments of the present invention as described above may be implemented in the form of a program instruction that can be performed through various computers, and may be recorded in a computer readable recording medium. The computer readable recording medium may include a program command, a data file, and a data structure independently or in combination. The program instruction recorded in the recording medium is specially designed and constructed for the present invention, but may be well known to and may be used by those skilled in the art of computer software.

The computer readable recording media may include a magnetic media, such as a hard disc, a floppy disc, and a magnetic tape, an optical recording media, such as a Compact Disc Read Only Memory (CD-ROM) and a Digital Versatile Disc (DVD), a magneto-optical media, such as a floptical disk, and a hardware device, such as a Read Only Memory (ROM), a Random Access Memory (RAM), and a flash memory, specifically configured to store and execute program instructions. In addition, the program instructions may include high class language codes, which can be executed in a computer by using an interpreter, as well as machine codes made by a compiler. The aforementioned hardware device may be configured to operate as one or more software modules in order to perform the operation of the present invention, and vice versa.

Embodiments of the present invention disclosed in the specification and the drawings are only examples to easily describe the technical matters of the present invention and assist in the understanding of the present invention, and do not limit the scope of the present invention. Therefore, it should be construed that all modifications or modified forms drawn by the technical idea of the present invention in addition to the embodiments disclosed herein are included in the scope of the present invention. It will be understood by those skilled in the art that various changes in form and details may be made therein without departing from the spirit and scope of the present invention as defined by the appended claims and their equivalents.

What is claimed is:

1. A touch pen comprising:
   a case;
   a tip that protrudes from one end of the case; and
   a button that allows an acoustic absorbent to contact or be detached from a portion of the tip for adjusting a natural frequency of the tip.

2. The touch pen of claim 1, wherein one or more buttons are mounted on the case to be pressed to contact the portion of the tip to absorb vibration.

3. The touch pen of claim 1, wherein the button adjusts a position of the acoustic absorbent that contacts the portion of the tip.

4. A touch pen comprising:
   a case;
   a tip that protrudes from one end of the case and has at least a first member and a second member, the first member being accepted by the second member; and
   an adjustment button that is connected to a portion of the tip to adjust an effective length of the tip for adjusting a natural frequency of the tip.

5. The touch pen of claim 4, wherein the first member has a touch portion, and the second member is connected with the adjustment button to be moveable by moving the adjustment button and has a hollow area into which the first member is inserted.

6. A method for supporting a touch function, the method comprising:
   determining a frequency band of a touch generated using a touch pen;
   extracting a function setup value corresponding to the frequency band; and executing a function according to the function setup value, wherein extracting the function setup value comprises extracting the function setup value corresponding to the frequency band of the generated touch and a current running program based on a pre-stored setup value table, and wherein the pre-stored setup value table includes the function setup value indicating at least one of a type of pen, a color of pen, and a line thickness, and further comprising executing an application supporting a note function, wherein the function setup value is different depending on the frequency band of the touch.

7. A method for supporting a touch function, the method comprising:

determining a frequency band of a touch generated using a touch pen;

extracting a function setup value corresponding to the frequency band; and executing a function according to the function setup value, wherein extracting the function setup value comprises extracting the function setup value corresponding to the frequency band of the generated touch and a current running program based on a pre-stored setup value table, and wherein the pre-stored setup value table includes the function setup value indicating a type of input field, and wherein when receiving the touch while an application supporting two or more types of input field is executed, the type of input field is different according to the frequency band of the touch.

8. The method of claim 7, wherein the type of input field includes at least one of a note window, a search window, and a schedule input window.

9. An apparatus for supporting a touch function, the apparatus comprising:

a touch panel configured to detect occurrence of a touch;

a sensor unit configured to receive frequency information of the touch;

a controller configured to determine a frequency band on the basis of the received frequency information, to extract a function setup value corresponding to the frequency band of the touch, and to execute a function according to the function setup value, a setup value table, wherein the frequency band of the touch is determined based on the setup value table, and wherein the setup value table stores current running programs and the function setup value corresponding to the frequency band of the touch, and wherein the setup value table includes the function setup value indicating at least one of a type of pen, a color of pen, and a line thickness, and the controller is further configured to execute an application supporting a note function, wherein the function setup value is different depending on the frequency band of the touch.

10. The apparatus of claim 9, wherein the sensor unit includes at least one of a vibration detection sensor and an acoustic detection sensor to detect a frequency of the touch, and transmits frequency information of the touch on the basis of the detected frequency to the controller.

11. An apparatus for supporting a touch function, the apparatus comprising:

a touch panel configured to detect occurrence of a touch;

a sensor unit configured to receive frequency information of the touch;

a controller configured to determine a frequency band on the basis of the received frequency information, to extract a function setup value corresponding to the frequency band of the touch, and to execute a function according to the function setup value, a setup value table, wherein the frequency band of the touch is determined based on the setup value table, and wherein the setup value table stores current running programs and the function setup value corresponding to the frequency band of the touch, and wherein the setup value table includes the function setup value indicating a type of input field, and wherein when receiving the touch while an application supporting two or more types of input field is executed, the type of input field is different according to the frequency band of the touch.

12. The apparatus of claim 11, wherein the type of input field includes at least one of a note window, a search window, and a schedule input window.

* * * * *